United States Patent
Haviv et al.

(10) Patent No.: US 11,514,647 B1
(45) Date of Patent: Nov. 29, 2022

(54) ROTATION AND TRANSLATION INVARIANT REPRESENTATION OF AN OBJECT

(71) Applicants: Ami Haviv, Tel Aviv-Jaffa (IL); Yair Hayut, Tel Aviv-Jaffa (IL); David Lehavi, Tel Aviv-Jaffa (IL)

(72) Inventors: Ami Haviv, Tel Aviv-Jaffa (IL); Yair Hayut, Tel Aviv-Jaffa (IL); David Lehavi, Tel Aviv-Jaffa (IL)

(73) Assignee: RESONAI LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/248,614

(22) Filed: Jan. 29, 2021

Related U.S. Application Data (60) Provisional application No. 62/967,631, filed on Jan. 30, 2020.

(51) Int. Cl.
  *G06T 17/20* (2006.01)
  *G06T 19/20* (2011.01)
  *G06F 17/15* (2006.01)
  *G06F 17/16* (2006.01)

(52) U.S. Cl.
  CPC .......... *G06T 17/205* (2013.01); *G06F 17/15* (2013.01); *G06F 17/16* (2013.01); *G06T 19/20* (2013.01); *G06T 2219/2016* (2013.01)

(58) Field of Classification Search
  CPC ....... G06T 17/205; G06T 17/15; G06T 19/20; G06T 2219/2016; G06F 17/16
  See application file for complete search history.

(56) References Cited

U.S. PATENT DOCUMENTS

| | | | | |
|---|---|---|---|---|
| 2010/0002942 | A1* | 1/2010 | Watson | G06T 7/35 382/218 |
| 2018/0357907 | A1* | 12/2018 | Reiley | H04W 4/44 |
| 2019/0384848 | A1* | 12/2019 | Helal | H03H 17/04 |
| 2020/0051340 | A1* | 2/2020 | El Hajjar | G06T 15/04 |

OTHER PUBLICATIONS

Koay, Cheng Guan. "Distributing points uniformly on the unit sphere under a mirror reflection symmetry constraint." arXiv.org, arXiv: 1403.3851, 2014. (Year: 2014).*

Jutzi, Boris, and H. Gross. "Nearest neighbour classification on laser point clouds to gain object structures from buildings." The International Archives of the Photogrammetry, Remote Sensing and Spatial Information Sciences 38. Part 1 (2009): 4-7. (Year: 2009).*

Giachetti, Andrea, and Christian Lovato. "Radial symmetry detection and shape characterization with the multiscale area projection transform." Computer graphics forum. vol. 31. No. 5. Oxford, UK: Blackwell Publishing Ltd, 2012. (Year: 2012).*

* cited by examiner

*Primary Examiner* — Daniel F Hajnik
(74) *Attorney, Agent, or Firm* — Reches Patents (57) ABSTRACT

A non-transitory computer readable medium that stores instructions that once executed by a computer cause the computer to execute the stages of: calculating a first function that represents an object that is three dimensional; calculating a second function that is a convolution or an approximated convolution of (a) the first function applied on points of the object, and (b) an other function that is the first function composed with a function that sends points of the object to opposite points; wherein the second function is translation invariant; and calculating the translation and rotation invariant features of the query object, based on the second function.

20 Claims, 5 Drawing Sheets

ROTATION AND TRANSLATION INVARIANT REPRESENTATION OF AN OBJECT

RELATED APPLICATIONS

This application claims priority from Provisional patent Ser. No. 62/967,631 filing date Jan. 30, 2020—which is incorporated herein by reference.

BACKGROUND OF THE INVENTION

Various applications involve comparing between representations of three dimensional objects. The comparison may include aligning the representations of the three dimensional or searching for translation and rotation invariant representations of the three dimensional objects.

There is a growing need to provide an efficient system, method and computer for finding translation and rotation invariant representations of three dimensional objects that provide adequate information about the three dimensional objects but are easy to calculate.

SUMMARY

A computerized system, a method and a non-transitory computer readable medium as illustrated in the application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "object" refers to a three dimensional object.

There may be provided various methods, systems and non-transitory computer readable medium for generating translation and rotation invariant representation of an object.

The translation and rotation invariant representation of an object enables to generate compact representations of multiple reference objects that can be searched (for example for finding within a matching or similar reference object for a query object) in a very accurate and cost saving (in terms of memory and computational resources).

The translation and rotation invariant representation may require less, by many orders of magnitude, than the storage required for storing a mesh, cloud of points or any other representation of the entire object. The storage consumption may be further reduced by storing a compressed version of the translation and rotation invariant representation, the compression may include storing elements of low frequency only.

The low frequency elements may provide a very accurate representation of objects—especially real world objects.

It should be noted that the invariant features produced by suggested method come with a set of integers: the degrees of $\|x\|^d$, and the frequencies l of the $Y_{l,m}$ involved in the generation of the feature. When starting with a first function over $R^3 \times S^2$ there are six such frequencies involved: two d's, two l's that come from the $R^3$ part and two l's that come from the $S^2$ part. This six-tuple represents a generalized frequency related to the invariant feature. We may take only invariants with a limited value on each element of the 6-tuple, or we may limit the sum of all 6 elements, or any other method.

Real world objects and manufactured objects are many times well-represented by taking only the low frequency invariants. For example, in a classification task involving a few 10's of classes we may take only invariants whose sum of the six-tuple is at most 8. For another example, for the task of building an invariant feature database for a search engine of millions of objects one may choose to take invariants that come from value at most 6 in each of the elements of the 6-tuple described above.

This fact, that the suggested invariants have this "frequency" ordering is powerful in utilizing them efficiently for different tasks and this property is unique to the suggested method.

The search using said translation and rotation invariant representations may require two orders of magnitudes less than searching using full representations of the object.

A possible alternative search method in a database may be to align the query object to its major axes (for example using Principal Component Analysis), and then computing the similarity of this aligned object to each of the pre-aligned objects in the database using some distance metric between objects or point clouds (for example Hausdorff metric). This method can require about two orders of magnitude more computation time for each similarity computation compared to the invariant method where computing the similarity of an object to the all database objects consists of (a) computing the invariant feature vector of the query object (b) matrix-vector multiplication of the query vector with all feature vectors of objects in the database. Since matrix vector computation is extremely parallelizable on a Graphic Processing Unit (GPU) while direct comparison as above is not, the computation time gap may be several orders of magnitude when using a GPU.

A possible alternative feature vector creation method object may be to compute a set of "points of interest" with some local features on the object using local geometric properties of the object, for example the corners of a cube might be such points. These methods do not work for all objects, and cannot easily detect global differences, for example the difference between a 3D cube and a 3D rectangular parallelepiped is not encoded locally but by the geometric relation between the corners. The method proposed here encodes these relations, and can separate between such objects. Similarly one can separate spheres from ellipsoids and ellipsoids from each other—in this case we do not have any natural interest points. Many natural objects are combinations of these base shapes, and the invariant features presented here can separate them well.

The time to compute a feature vector of a query object is approximately 0.1 seconds on a single core CPU and this can be an order or orders of magnitude faster on a GPU or even multi-core CPU. Thus—many comparisons of three dimensional objects can be done in real time—thus facilitating real time searches—especially in vast databases that may include many reference objects.

The time to compare the feature vector of one object to the feature vectors of a database with one million objects is approximately 0.1 seconds on a single core CPU and this can be orders of magnitude faster on a GPU or even multi-core CPU.

The compressed representation of the object is strongly related to the "frequency space" properties of the object. This is directly useful for detecting symmetries as shown in a section in this proposal, and is useful for "efficiently compressing" the model—by taking the low-frequency components of the invariant feature vector—while maintaining enough information to separate objects from each other, and to classify objects.

In terms of memory use, in the suggested implementation, a few thousand features (chosen to be those of lowest frequency) using (for example) two bytes per feature are enough to implement a useful search engine on hundreds of thousands of objects which may be similar to each other, while representing the object directly can require hundreds of thousands of points in a point cloud, or hundreds of thousands of polygons, so our method may require much less memory to store the object search database.

The terms translation and shift are used in an interchangeable manner.

The following mathematical terms are being used in the specification (see www.wikipedia.org):

a. A two dimensional sphere (also known as sphere or $S^2$) is a set of points that are all the same distance r from a given point in a three-dimensional space. This distance r is the radius of the sphere, and the given point is the center of the sphere. The radius may equal one.

b. Spherical harmonics are the angular portion of a set of solutions to Laplace's equation. Represented in a system of spherical coordinates, Laplace's spherical harmonics $Y_l^m$ are a specific set of spherical harmonics that forms an orthogonal system.

c. A spherical function is a function on the two dimensional sphere.

d. Clebsch-Gordan coefficients are the coefficients appearing in the expansion of the product of two spherical harmonics in terms of spherical harmonics themselves. A variety of techniques are available for doing essentially the same calculation, including the Wigner 3-jm symbol, the Racah coefficients, and the Slater integrals. Abstractly, the Clebsch-Gordan coefficients express the tensor product of two irreducible representations of the rotation group as a sum of irreducible representations: suitably normalized, the coefficients are then the multiplicities.

e. Convolution operation is represented by "*".

There may be provided a first function that may represent a three dimensional object. In various examples the first function is illustrated as a sum of delta functions—but other first functions may be used, such as the delta function of the surface of the 3D object.

Figure 1:
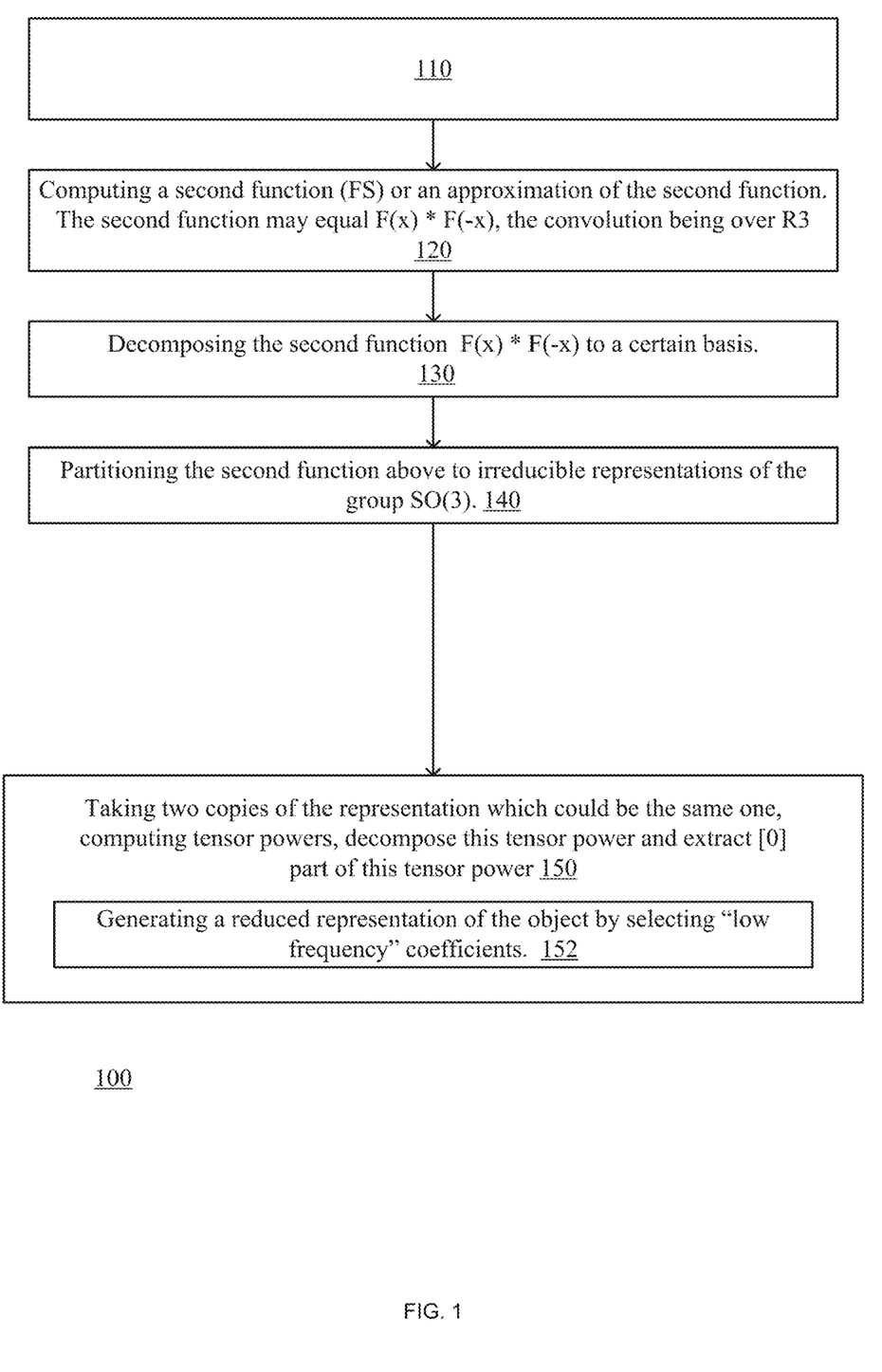
FIG. 1 illustrates an example of a method.

FIG. 1 illustrates an example of method 100.

Method 100 by step 110 of calculating a first function that represents the object. Various examples of the first function are illustrated in the application.

It is assumed, for simplicity of explanation that step 110 may include sampling (uniformly of non-uniformly) a three dimensional object (hereinafter object) or the surface of such object at multiple sample points and calculating a first function (F(x)) which is a sum of delta functions on sample points. The variable x represents three-dimensional coordinates of points of the object—the points may or may not be the sample points. The variable (−x) represents three-dimensional coordinates of points that have opposite coordinates to the points. We use the term other function F(−x) to mean the first function F(x) composed with the function that sends x to −x. For example, if F(x) is the delta function of the point (1, 2, 5) in 3-dimensional space, then the other function F(−x) is the delta function of the point (−1, −2, −5). For simplicity of explanation F(x) is referred to as the first function applied on points and F(−x) is referred to as the other function or as the first function applied on opposite points.

Any other step for providing information regarding the object can be used.

Step 110 may be followed by step 120 of computing a second function (FS) or an approximation of the second function. The second function may equal F(x)*F(−x), the convolution being over $R^3$.

For example, the approximation of the second function may equal F(x)*an approximation of F(−x), the convolution being over $R^3$. It should be noted that the approximation may replace the full calculation of the convolution.

F(x) and F(−x) may be applied on different channels (for example colors) of the representation of the object—or may be applied on the same channel.

Step 120 may be followed by step 130 of decomposing the second function F(x)*F(−x) to a certain basis $\|x\|^d$ ($Y_{l,m}$ (x/$\|x\|$)) Where $Y_{l,m}$ are the spherical harmonic functions defined on the unit sphere.

Step 130 may be followed by step 140 of partitioning the second function above to irreducible representations of the group SO(3). The irreducible representations are indexed by natural numbers, these numbers are called the type of the representation [l]. Irreducible representations of the same type have the same value of [l].

A copy of the representation [l] is, for example, the space spanned by collecting the functions $\|x\|^d$ ($Y_{l,m}$ (x/$\|x\|$)) with a given l and d.

Step 140 may be followed by step 150 of taking two copies of the representation [l] which could be the same one, computing tensor product of these two representations of the same type which have the same [l] as tensor [l]. and decompose this tensor product and extract [0] part of this tensor product. This is repeated for all (or at least some) pairs of representations of the same type appearing in the decomposition. The output of step 150 are translation and rotation invariant coefficients.

Step 150 may include step 152 of generating a reduced representation of the object by selecting "low frequency" coefficients—from representations [l] with bounded l, and limiting the degree d of $\|x\|^d$ ($Y_{l,m}$ (x/$\|x\|$)).

Other examples of the first function and/or step 110 are provided below.

If the object is a mesh, the first function F(x) can be represented as a sum F_p(x) on all polygons p in the mesh, and where $Fp(x)=\Sigma_{d,l,m,p} a_{d,l,m,p} \|x\|^d \cdot Y_{l,m}(x)$, where $a_{d,l,m,p}$ is the integral on $R^3$ of the delta function on the polygon p multiplied by the conjugate of $Y_{l,m}(x)$. This first function does not sample the object and it may be more accurate than using sample points.

The input object may be represented as a point cloud or as a polygon mesh, or as a surface in $R^3$ defined by equations, or a union of such surfaces, for example an ellipsoid, or the boundary of a polyhedron The polygons may have a color texture on them, the points in the cloud may have colors, or the surface may come with a color function.

We obtain a set of sample points by subsampling the point cloud, or by sampling points in the polygons or by sampling the surface, or by taking the center of mass of each polygon in the mesh representation and weighting by the area of the polygon, or any other method.

A possible first function may be created by summing weight(p)·color(p)·delta(p) on the sample points p, where color is the intensity of a channel in the RGB color representation of the point p and the weight is for example the area of the polygon of p as described above. We therefore have more than one possible first function for the same object and we may proceed to generate invariants from each of them separately. This may be done for each color—red or any other color.

The first function may be represented or approximated by $F(x)=\Sigma_{d,l,m} a_{d,l,m} \|x\|^d \cdot Y_{l,m}(x)$. This is a function from $R^3$ to the complex numbers.

Another possible first function may be created by summing weight(p)·red(p)·delta(p, n_p) on the sample points p where each point p has normal information n_p, and weight (p) and red(p) are as above. This is a function from $R^3 \times S^2$ to the complex numbers.

We may choose to represent this alternative first function as $$F(x)=\Sigma_{d,l1,m1,l2,m2} a_{d,l1,m1,l2,m2} \|x\|^d \cdot Y_{l1,m1}(x) \cdot Y_{l2,m2}(s)$$

Where x in $R^3$ and "s" represent a point in $S^2$.

For any such representation of a first function we can compute second functions that are translation-invariant.

From any function represented as $\Sigma_{d,l,m} a_{d,l,m} \|x\|^2 \cdot Y_{l,m}(x)$ translation and rotation-invariant features can be generated. This is a separate construction which does not require the function to come from a first function as we described.

Similarly, from any representation of a function $\Sigma_{d,l1,m1,l2,m2} a_{d,l1,m1} \|x\|^d \cdot Y_{l1,m1}(x) \cdot a_{l2,m2} Y_{l2,m2}(s)$ a translation and rotation invariant features can be computed. Point is s is located on the sphere.

Geometric Construction

There is provided a method for geometric construction of invariants.

It may be assumed that the normals to the sample points are known.

Figure 2:
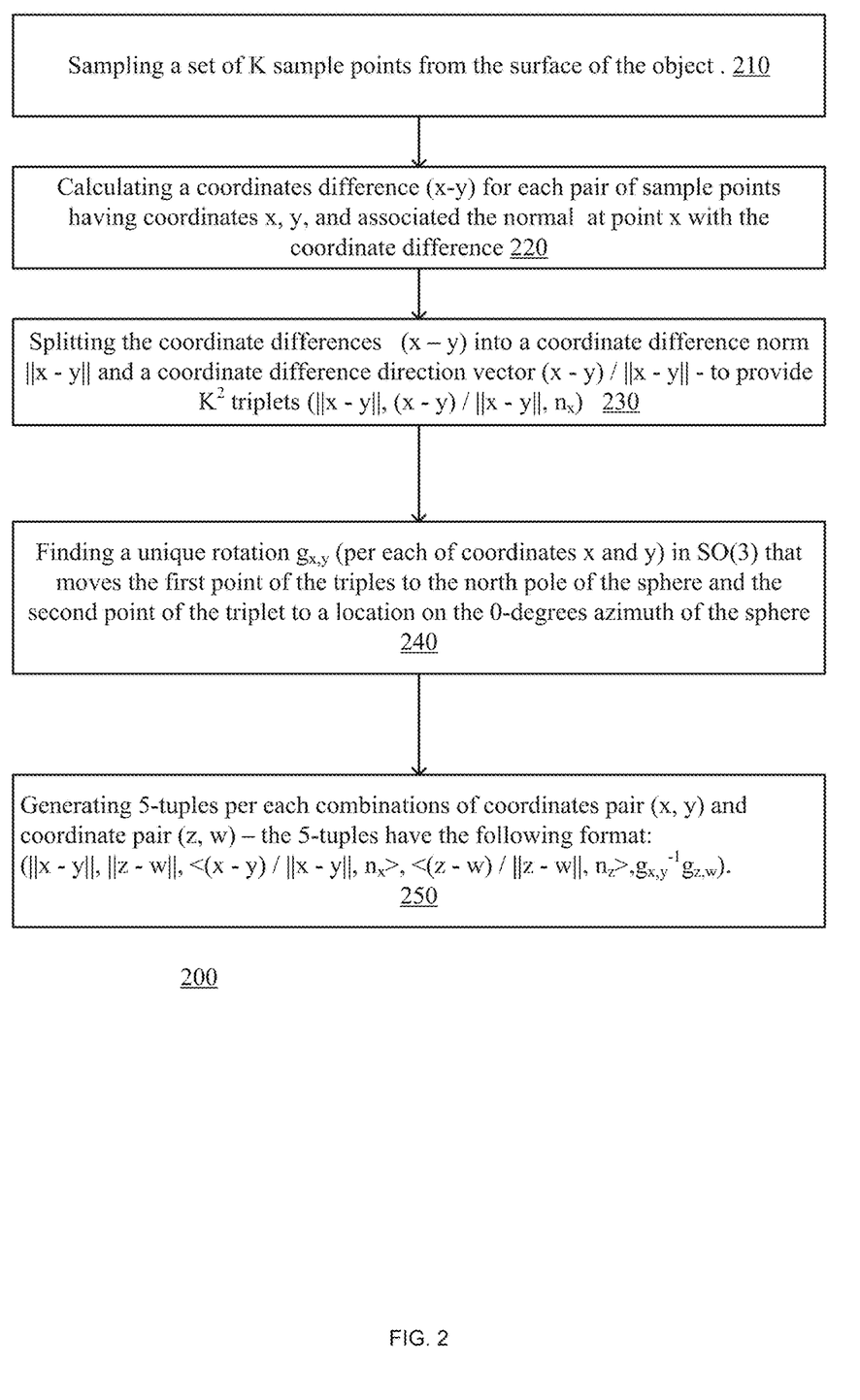
FIG. 2 illustrates an example of a method.

FIG. 2 illustrates method 200.

Method 200 may start by step 210 of sampling a set of K sample points from the surface of the object. When the object is represented as a mesh—step 210 may include selecting sample points from the polygons of the mesh.

The sampling can be made in any manner, but, it is useful to use a sampling which converges quickly to the measure induced on the 3D object by its embedding in $R^3$.

For example, the method may construct an axis-aligned bounding box (AABB) tree on the faces of the object (if the object is a polyhedron) and sample from each AABB box an equal number of points uniformly proportionally to the surface area inside this box. As indicated above, step 210 may also include recording the normal $n_x$ at each point x, to provide pairs x, $n_x$ in $R^3 \times S^2$.

Step 210 may be followed by step 220 of calculating a coordinates difference (x−y) for each pair of sample points having coordinates x, y, and associated the normal $n_x$ at point x with the coordinate difference. As in the case of x−y represents a three dimensional coordinate.

There are $K^2$ pairs of (x−y, $n_x$) in $R^3 \times S^2$. Notice that each pair is translation invariant as the normal does not depend on the translation of the 2D object in space and neither does x−y (assuming that the same sampling process is used for the object and its translation, but it should be noted that the results do not strongly depend on the sample).

Step 220 may be followed by step 230 of splitting the coordinate differences (x−y) into a coordinate difference norm $\|x-y\|$ and a coordinate difference direction vector $(x-y)/\|x-y\|$—to provide $K^2$ triplets ($\|x-y\|$, $(x-y)/\|x-y\|$, $n_x$) in $R^+ \times S^2 \times S^2$. There are $K^2$ such triplets.

Each triplet contains a pair of points on $S^2$.

Step 230 may be followed by step 240 of finding a unique rotation $g_{x,y}$ (per each of coordinates x and y) in SO(3) that moves the first point of the triples to the north pole of the sphere and the second point of the triplet to a location on the 0-degrees azimuth of the sphere. The method may ignore cases where x and y are identical or antipodal.

Step 240 may be followed by step 250 of generating 5-tuples per each combinations of coordinates pair (x, y) and coordinate pair (z, w)—the 5-tuples have the following format:

$$(\|x-y\|, \|z-w\|, <(x-y)/\|x-y\|, n_x>, <(z-w)/\|z-w\|, n_z>, g_{x,y}^{-1} g_{z,w}).$$

The exponent (−1) in the expression $g_{x,y}^{-1}$ means to take the inverse element of $g_{x,y}$ which is an element in the group SO(3)

These are 5-tuples in $R^+ \times R^+ \times (-1, 1) \times (-1, 1) \times SO(3)$ Each 5-tuple is translation and rotation invariant. All the coordinates apart from the SO(3) one are evidently so, and rotating by some element h gives an SO(3) coordinate of $$(h\ g_{x,y})^{-1}(h\ g_{z,w}) = g_{x,y}^{-1} h^{-1} h g_{z,w} = g_{x,y}^{-1} g_{z,w}.$$

There are $K^4$ such 5-tuples.

The generated translation and rotation invariants may depend on the sampling, but if the sampling set is large enough then low-degree functionals on the set of invariants will be close on almost all sampling sets.

Algebraic Construction

There is provided a method for algebraic construction of invariants.

Figure 3:
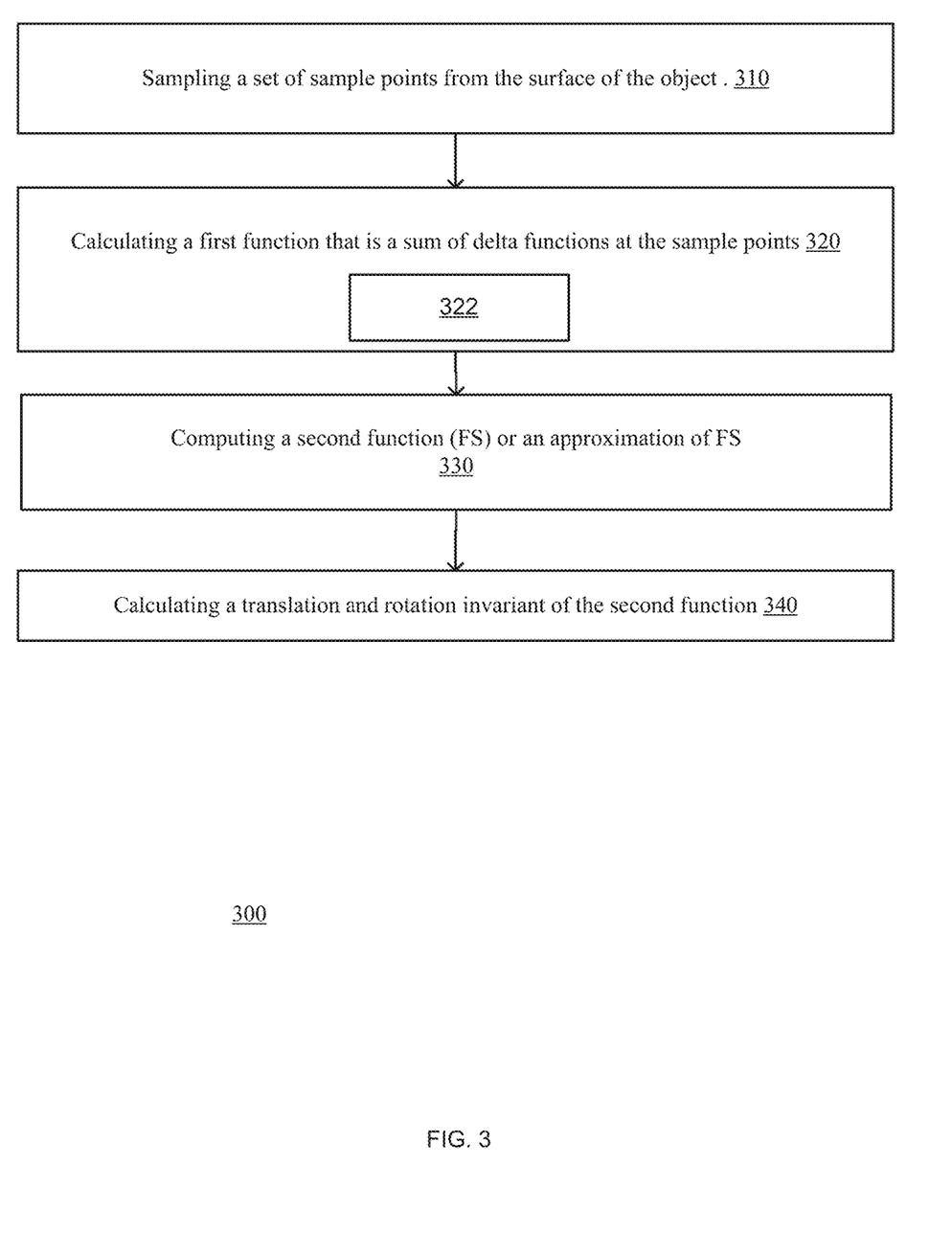
FIG. 3 illustrates an example of a method.

FIG. 3 illustrates method 300.

Method 300 may start by step 310 of sampling a set of points from the object surface—in the mesh example we take points from the polygons of the mesh. This may be done in the manner illustrated in step 310.

Step 310 may include step 320 of calculating a first function $F: R^3 \to C$ that may be a sum of delta functions on the set S of sample points: $F(x) = \Sigma_{p \in S} \delta_p(x)$.

$Y_{l,m}$ (−l≤m≤l) are spherical harmonic functions defined on the unit sphere $S^2$.

Third functions—also referred to as (d, l, m) functions are of the following form: $\|x\|^d (Y_{l,m} (x/\|x\|))$. The third functions for all integers d>=l, and −l<=m<=l and d=l (mod 2) form a basis for the Hilbert space of all complex valued $L_2$ functions on real space ($\|x\|$ is Euclidean norm). The third functions are homogeneous polynomials in the variables x1, x2, x3, with total degree d.

Step 320 may include step 322 of projecting the first function F to a space of the third functions with d<=d_max, l<=l_max. The values of d_max and l_max can be received or determined in any manner. They may be determined to provide any desired tradeoff between accuracy and computations cost and/or duration.

Notice that since $Y_{l,m}(x) = Y_{l,m}(-x)$ up to a constant factor, it does not require more computations to compute this projection for F(−x). This projection is only an approximation of the original function, but we will continue calling the resulting function by the name F(x).

Step 310 may be followed by step 330 of computing a second function (FS) that may equal F(x)*an approximation of F(−x), the convolution being over $R^3$.

Note—the second function is shift invariant. If F is a complex function on $R^3$ and d is a vector in $R^3$, then $F(x)_{shift} = F(x+d)$. The second function $F(x)_{shift} * F(-x)_{shift}$ equals $F(x)*F(-x)$.

The outcome of step 330 may be a representation of FS that is a weighted sum of (d, l, m) functions $FS(x) = \Sigma_{d,l,m} a_{d,l,m} \|x\|^2 \cdot Y_{l,m}(x)$.

Step 330 may include computing an approximation of the second function (F(x)*F(−x)). The approximation may be calculated based on the moment generating function of F(x).

The moment generating function equals $M_F(t) = \int_{R^3} e^{-t \cdot x} F(x) dx$ is the moment generating function of F. And $M_{F*G} = M_F \cdot M_G$ (up to normalizing constants which depend on the number of sample points).

$M_F$ is a sum of moment monomials $P_d(t) = \int_x t^d/d!\ x^d\ F(x) dx$ (where $t^d = t_1^{d_1} \cdot t_2^{d_2} \cdot t_3^{d_3}$ and $(d1, d2, d3)! = d1!\ d2!\ d3!$).

When F(x) is a sum of delta functions then the moment monomial integral above is simply a sum of evaluations of $x^d$ on the support of F(x), multiplied by the monomial $t^d$ multiplied by a coefficient.

Step 330 may include computing the moment monomials up to total degree d_max. The result is a polynomial in variable t.

The computing of the moment generating function of the second function $M_{F(x)*F(-x)}$ includes multiplying the polynomials $M_{F(x)}$ and $M_{F(-x)}$, and taking the resulting polynomial restricted to degree d_max. This is the product of the restrictions of the polynomials $M_{F(x)}$ and $M_{F(-x)}$—up to degree d_max, where we restrict the result to degree d_max as well.

An alternative method to compute $M_{F(x)*F(-x)}$ up to degree d_max which may be more numerically stable is to do the computations when F(x) is already written in the basis of the (d, l, m) functions, d<=d_max.

In this case step 330 may include:
a. Writing $M_{F(x)}$ and $M_{F(-x)}$ in the basis of (d, l, m) functions, using the base change matrix from monomials to the (d, l, m) polynomials basis, and the evaluations of F(x) and F(−x).
b. Multiplying $M_{F(x)}$ and $M_{F(-x)}$, writing the result in the same basis. This may include using the Clebsch-Gordan formulas to decompose products of functions of the form (d1, l1, m1) and (d2, l2, m2) to the basis (d, l, m).

The second function can be a weighted sum of (d, l, m) functions $FS(x) = \Sigma_{d,l,m} a_{d,l,m} \|x\|^d \cdot Y_{l,m}(x)$.

It should be noted that there may be another manner for calculating the second function—by using the normals to the sample points.

In many cases (for example when the 3D object is defined by a mesh, but point clouds from 3D scans contain normals many times, or the normal may be estimated from the points with good accuracy) we have for each point in the 3D object the normal vector to the surface defining the 3D object at that point. We can extend the ideas described above to use those normal vectors.

When sample point information includes the normals at the sampled points, each sample point now corresponds to a delta function in the product space $R^3 \times S^2$, and the sampled version of the object is represented by the first function F which is a sum of these delta functions, which reside in the space $L_2(R^3) \otimes L_2(S^2)$.

Products of a (d, l, m) function for the $R^3$ coordinate, and an (l, m) function for the $S^2$ coordinate form a basis for $L_2$ functions on $R^3 \times S^2$. Each basis function is represented by a pair (d1, l1, m1), (l2, m2).

To save computation time and memory, instead of calculating the full convolution of F(x)*F(−x), the method may maintain F(x) to be the sum of the delta functions on $R^3 \times S^2$, but integrate F(−x) over $S^2$ before applying the convolution.

This integration is easy to do given the decomposition of F(−x) as a sum of (d, l, m) times (d, m) functions—it is simply taking only the part of the decomposition with functions of the form (k, l, m), (0, 0). This leads to lower computation time and memory requirements, while preserving most of the information.

The second function (with the $S^2$ part of F(−x) restricted as described), is shift-invariant function in the space of functions $L_2(R^3) \otimes L_2(S^2)$, given as a linear combination of the above described basis elements, namely products of (d1, l1, m1) and (l2, m2) functions.

A translation invariant representation may be provided by decomposing of the second function FS to representations of type [l1]⊗[l2]—the space of all products of (d, l1, m1) and (l2, m2) for fixed d, l1, l2 and varying m1 and m2 form a copy of this representation inside $L_2(R^3) \otimes L_2(S^2)$.

Step 330 may include using, for each such representation [l1]⊗[l2], the Clebsch-Gordan formula to project such representation to a sum of irreducible representations of SO(3).

We have now decomposed FS to a sum of vectors, each contained in an irreducible representation of some type [l] of SO(3) (where the same type may repeat several times in the decomposition).

Step 330 may be followed by step 340 of calculating a translation and rotation invariant of the second function based on the outcome of step 320.

Step 340 may receive as input $M_{F*F_-}$, written in the (d, l, m) basis.

Additionally or alternatively, step 340 may receive as input F(x)*F(−x).

Any transformation of the second function may be provided.

The second function may be represented as a sum $\Sigma_i v_i$, where the vector $v_i$ is in an irreducible representation $[n_i]$. Notice that the same representation type [l] will usually repeat several times in the decomposition.

If $[n_i]$ is of type [0] then since [0] is invariant to rotations, the 0-dimensional vector $v_i$ is a feature of the object that is translation and rotation invariant.

Recall that FS=$\Sigma_i v_i$, where the vector vl is in an irreducible representation $[n_i]$ of SO(3). Take i,j in the decomposition of the second function with the same type, i.e. $n_i=n_j$ (we can also use i=j).

Consider the representation $[n_i] \otimes [n_j]$. This representation decomposes to irreducible representations, and is known to contain exactly one copy of the representation [0], and let P be the projection $P_{ij}$: $[n_i] \otimes [n_j] \to [0]$ (the projection can be computed from the Clebsch-Gordan formula). Then $P_{ij}$ ($v_i \otimes v_j$) is a feature of the original 3D object which is invariant to translations and rotations.

Extending the same idea, take three irreducible representations $[n_i]$, $[n_j]$, $[n_k]$ and consider the tensor power $[n_i] \otimes [n_j] \otimes [n_k]$. Use the Clebcsh-Gordan formulas to decompose this representation into irreducible representations of SO(3). There may be several copies of [0] in the decomposition, and for each the projection of $v_i \otimes v_j \otimes v_k$ will be invariant to rotations and shifts of the sample of the original 3D object. This scheme works for any tensor power, the choice of which tensor powers to use is an implementation choice.

Figure 4:
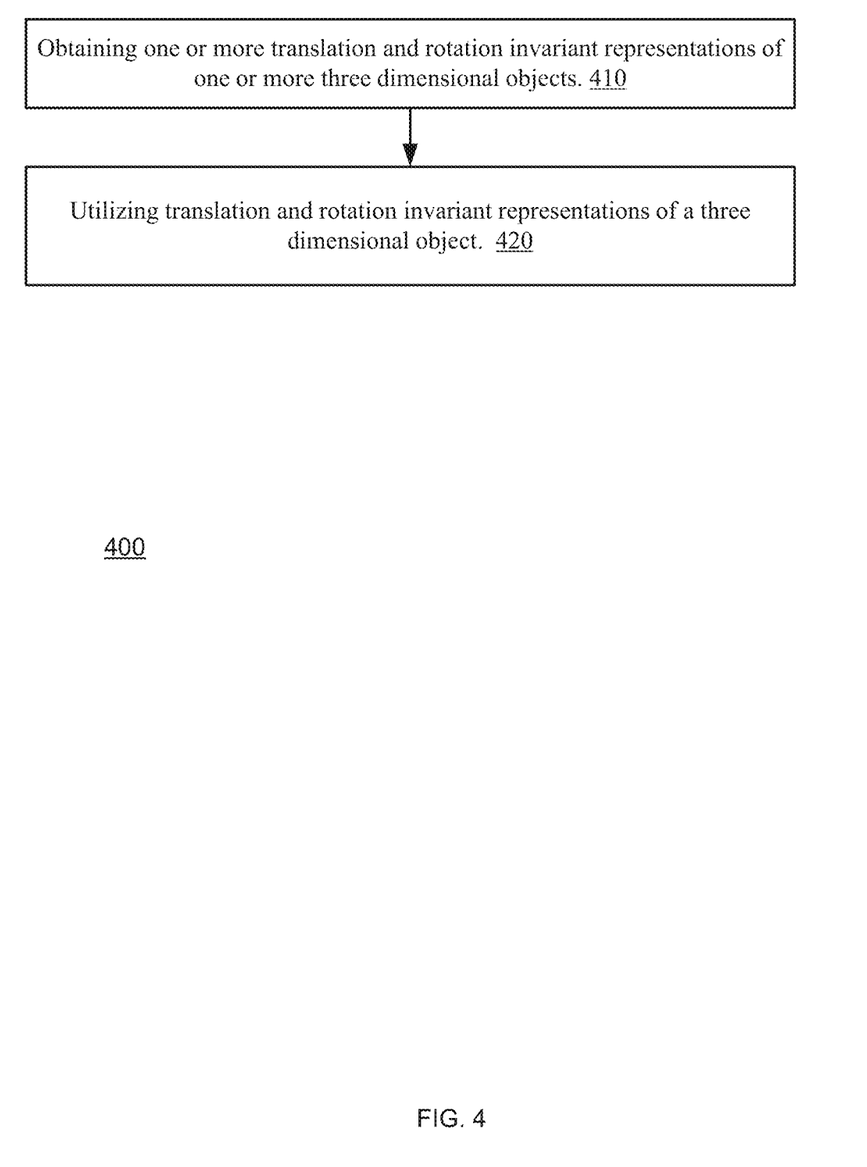
FIG. 4 illustrates an example of a method.

FIG. 4 illustrates method 400 for utilizing translation and rotation invariant representations of a three dimensional object.

Method 400 may include step 410 of obtaining one or more translation and rotation invariant representations of one or more three dimensional objects.

The obtaining may include receiving the one or more translation and rotation invariant representations, generating the one or more translation and rotation invariant representations, receiving some one or more translation and rotation invariant representations and generating some other one or more translation and rotation invariant representations.

The one or more translation and rotation invariant representations are generated using any method of methods 1mentioned in the application.

Step 410 may be followed by step 420 of utilizing translation and rotation invariant representations of a three dimensional object ("object").

Step 420 may include at least one out of:

a. Determining a rotational symmetry of the one or more objects, based on the one or more translation and rotation invariant representations.

b. Calculating a relationship between objects of the one or more objects, based on the one or more translation and rotation invariant representations. This may include, for example using one of the objects as a search query or otherwise searching for another object of the one or more objects, based on the one or more translation and rotation invariant representations.

c. Classifying the one or more objects to classes and/or training a classifier to classify objects based on the one or more translation and rotation invariant representations.

The mentioned above methods compute, from an object, translation and rotation invariant elements (the coefficients of all copies of the representation [0] appearing in the decomposition of a function FS and tensor powers of this decomposition).

The translation and rotation invariant elements of an object may be organized in any manner—for example—in a translation and rotation invariant vector.

All the mentioned above methods include sampling the object at sample points. But with enough sample points, the resulting feature vectors are very close to each other (in $L_2$ distance)—much closer to each other than to feature vectors of other objects. The choice of the number of sample points is an implementation choice, depending on the size and complexity of the 3D objects.

Detecting Object Rotational Symmetries from the Invariant Features

It may be beneficial to detect a rotational symmetry (or an approximate rotational symmetry) of the object around a symmetry axis that may be known or may be unknown.

This information may be beneficial for various purposes—for example for examining defects of objects that should have rotational symmetry—for example during defect detection and/or manufacturing process monitoring.

Any of the methods mentioned above may provide a translation and rotation invariant representation of the object.

Because of the translation and rotation indifference—the detection of the rotational symmetry may be computed by:

a. By the construction of the translation and rotation-invariant features it can be seen that each such feature is an explicit polynomial of degree 2 in the variables $b_{d,l,m}$, where FS(x)=$\Sigma_{d,l,m} b_{d,l,m} \|x\|^d \cdot Y_{l,m}(x)$ where FS is the second function as above.

b. Assuming a first function F(x) of the object under the assumption that the object has a certain symmetry axis (specifically when using symmetry to rotation around the vertical axis (0, 0, 1)) and F(x) has the following format (or has the following parametric representation—where the values of $a_{d,l,m}$ are unknown and are variables) F(x)= $\Sigma_{d,l,m} a_{d,l,m} \|x\|^d \cdot Y_{l,m}(x)$.

c. Given the assumed symmetry—some of the $a_{d,l,m}$ should be zero d. By the construction of FS as a convolution of F(x)*F(−x) where F is the first function, it can be seen that the coefficients $b_{d,l,m}$ are degree-2 polynomials in the variables $a_{d,l,m}$.

e. Using the above there are provided equations relating each invariant feature to a degree-4 polynomial in the variables $a_{d,l,m}$. There are also given other equations $a_{d,l,m}$ for some of the variables depending on the assumed symmetry.

f. Since the rotation and translation invariant features of the input object were computed there is a system of polynomial equations we may attempt to solve.

g. If the object is symmetrical then there is a solution. If the object is approximately symmetrical then there is an approximate solution, where by "approximately symmetrical" we mean that the first function and the first function of the rotated object are close in L2 distance.

The actual symmetrical axis is not known in advance. The rotational symmetry can be continuous—for every rotation of any angle of the object around the symmetry axis, or it can be discrete—for all rotations with angles $2\pi i/N$ for all integers i and some fixed given integer N.

Assuming that object M is symmetric around the axis (0, 0, 1)—the canonical "up" axis in 3D space.

The method may include:
a. Writing a parametric representation of the first function as a sum $F(x)=\Sigma_{d,l,m} a_{d,l,m} \|x\|^d \cdot Y_{l,m}(x)$ where the $a_{d,l,m}$ are unknown variables
b. By the definition of $Y_{l,m}(x)$, a rotational symmetry of F(x) around the axis (0, 0, 1) implies that the coefficients $a_{d,l,m}$ must be zero for all m not equal to 0 in the case of full rotational symmetry, and for all m not divisible by N in the case of $2\pi i/N$ symmetry.

The reason is that $Y_{l,m}(x)=C_{l,m}F(\theta)\exp(im\phi)$ where $i=\sqrt{(-1)}$, $\theta$ is the elevation angle of x and $\phi$ is the azimuthal angle of x, so rotation around the "up" axis (0, 0, 1) by any angle $\alpha$ moves $Y_{l,m}(x)$ to $\exp(im\alpha)Y_{l,m}(x)$ and by uniqueness of the decomposition we must have $\exp(im\alpha)=1$ for all rotation angles $\alpha$ maintaining the symmetry.

The second function is derived from F and can also be decomposed $FS(x)=\Sigma_{d,l,m} b_{d,l,m} \|x\|^d \cdot Y_{l,m}(x)$, where $b_{d,l,m}$ are polynomials of degree 2 in the variables $a_{d,l,m}$.

The translation and rotation-invariant features are polynomials of degree 2 in the variables $b_{d,l,m}$. We therefore have explicit polynomial equations of degree 4 relating the coefficients $a_{d,l,m}$ to the invariant features.

If we are given as input the invariant features, and we guess that the object is rotation invariant, we can attempt to solve the polynomial equations given the conditions on the variables $a_{d,l,m}$ deduced by the assumed symmetry.

If the object is symmetric to rotations then the equations have a solution.

If an approximate symmetry exists then the equations have an approximate solution (and it is possible to quantify this statement as we will see below). A possible method of solution is linearizing: take every monomial of degree 4 in the variables $a_{d,l,m}$ to be a new variable, and derive a linear set of equations which may be solved, or approximately solved by for example singular value decomposition, where the quality of the approximate solution is given by the ratio of the smallest eigenvalue of the solution matrix to the second-smallest eigenvalue (or any other method of clustering the eigenvalues).

Another method for calculating rotational symmetry may involve using Grobner bases, or any method to approximately solve polynomial equations.

It should be noted that the rotational symmetry may be determined using the normals to the sample points where the first function is in $L_2(R^3) \otimes L_2(S^2)$. This is useful as it may yield more equations that render the system solvable.

Another possible option is to use the second function FS as the starting point and defining basic variables as the coefficients of the decomposition of FS to irreducible representations of SO(3). This may have the advantage of working with lower-order polynomial equations.

Here is a similarity metric that is useful for defining approximate symmetry and similarity of objects in general:
a. Input: two 3D objects given as a mesh or point cloud.
b. Compute one of the first function as we described.
c. Represent a first function of the first object as a sum $F1(x)=\Sigma_{d,l,m} a1_{d,l,m} \|x\|^d \cdot Y_{l,m}(x)$ and a first function of the second object as a sum $F2(x)=\Sigma_{d,l,m} a2_{d,l,m} \|x\|^d \cdot Y_{l,m}(x)$
d. Compute a distance between the vectors of coefficients a1 and a2, for example the normalized correlation between the two vectors may be used, where a correlation of 1 means the objects are very similar.

Since the first function is not translation and rotation invariant the similarity will depend on the specific pose of the objects in 3D space. If the second object is the first object rotated around the symmetry axis in a symmetry angle, then the object is approximately symmetric to this rotation angle of the two vectors a1 and a2 are for example highly correlated.

For general two objects, there is an optimal pose of the objects that gives the highest correlation. This is an example of a pose where the objects are "most close to each other".

Another possible option is to use the second function FS as the starting point and defining basic variables as the coefficients of the decomposition of FS to irreducible representations of SO(3). This may have the advantage of working with lower-order polynomial equations.

Accordingly—the determining of the radial symmetry of the three dimensional object may include (a) assuming the radial symmetry, and (b) solving a family of polynomial equations that that are satisfied, under the assumed radial symmetry, by the translation and rotation invariant features of the three dimensional object.

The determining of the radial symmetry of the three dimensional object based on the translation and rotation invariant features of the three dimensional object, may include using the fact that translation and rotation invariant features satisfy a family of polynomial equations if the object has a radial symmetry, and the translation and rotation invariant features approximately satisfy a family of polynomial equations if the object has an approximate radial symmetry in the sense that a rotation of the object around a certain axis yields a similar object in a similarity object such as Hausdorff distance, and these polynomial equations may be written and solved in a computationally efficient way, where the symmetry group may be discrete or the full rotation group around the symmetry axis.

Other usages of the translation and rotation invariant representation of objects may include search engines and classification of objects.

The translation and rotation invariant representation of objects may be used in search engines as they obliviate the need to align (translation wise and rotation wise) objects that are compared to each other—which may save substantial computational resources.

The search engine may search for objects that are similar to each other using any similarity criteria or metric. The similarity may be determined, for example by comparing between any of the mentioned above translation and rotation invariant representations of the objects.

Define a similarity metric between two objects: take two sequences of invariant descriptors as above and take their correlation. An object will have a correlation of 1 with all rotations and shifts of the same object (up to sampling), and correlation close to 1 with objects which are similar to the object, where similarity of objects M and N is defined to be how close the delta functions on the objects f_M and g_N are (in some smoothed $L_2$-distance), if we could position M and N inside 3D space in the optimal poses so they are "on top of each other".

The search may include—given a database of 3D objects M_i, we pre-compute their invariant descriptors Inv(M_i) (which may be simply a vector of floating point numbers) and store them. Given a search query 3D object Q, we compute the invariant descriptor Inv(Q) and then compute the correlation of Inv(Q) with all the Inv(M_i). The M_i objects with the highest correlation to Q will be output. The use of correlation is an implementation detail and any metric that uses the invariant features may be used. A advantage of the invariants as constructed above is that they are ordered by generalized frequency and therefore we may take a shorted feature vector by taking low-frequency invariants, which in practice represent real-world objects well, and this does not require any training set to "learn" what features are better.

Use case: 3D object classifier given a training dataset.

We are given a set of objects with tags defined by human interactors or another method. The tags describe the object as a class, for example the tags may be "cow", "chair", "ball", "cup".

If you follow the computation of a specific invariant feature in the previous section, you will see it comes with two or three parameters: (d, l) originating from the (d, l, m) functions taking part in the $R^3$ component of the feature, and if we use normals, also l' that comes from the (l', m') functions taking part in the $S^2$ component. Taking a bound N, compute all such features with d+l+l'<N. Intuitively, these are features corresponding to "low frequencies". These features will be the input to our classifier (we may optimize on the parameter N).

For this set of features, train a neural network with:
a. Input: objects, given by their features.
b. Output: The suggested tag of the object.
c. Training input: the manual tags given to the objects.
d. Cost function: implementation choice.

A possible implementation uses 107 input features, chosen from the degree-sum criterion above.

The input features do not have a local structure so convolutional layers are less effective. A possible implementation uses 2 fully connected layers, the first with 21 neurons, and the second layer is the decision layer, where the number of neurons is the number of tags.

An advantage of the invariants as constructed above is that they are ordered by generalized frequency and therefore we may take a shorted feature vector by taking low-frequency invariants, which in practice represent real-world objects well, and this does not require any training set to "learn" what features are better. A shorter feature vector requires less training data to the classifier which is an advantage.

Figure 5:
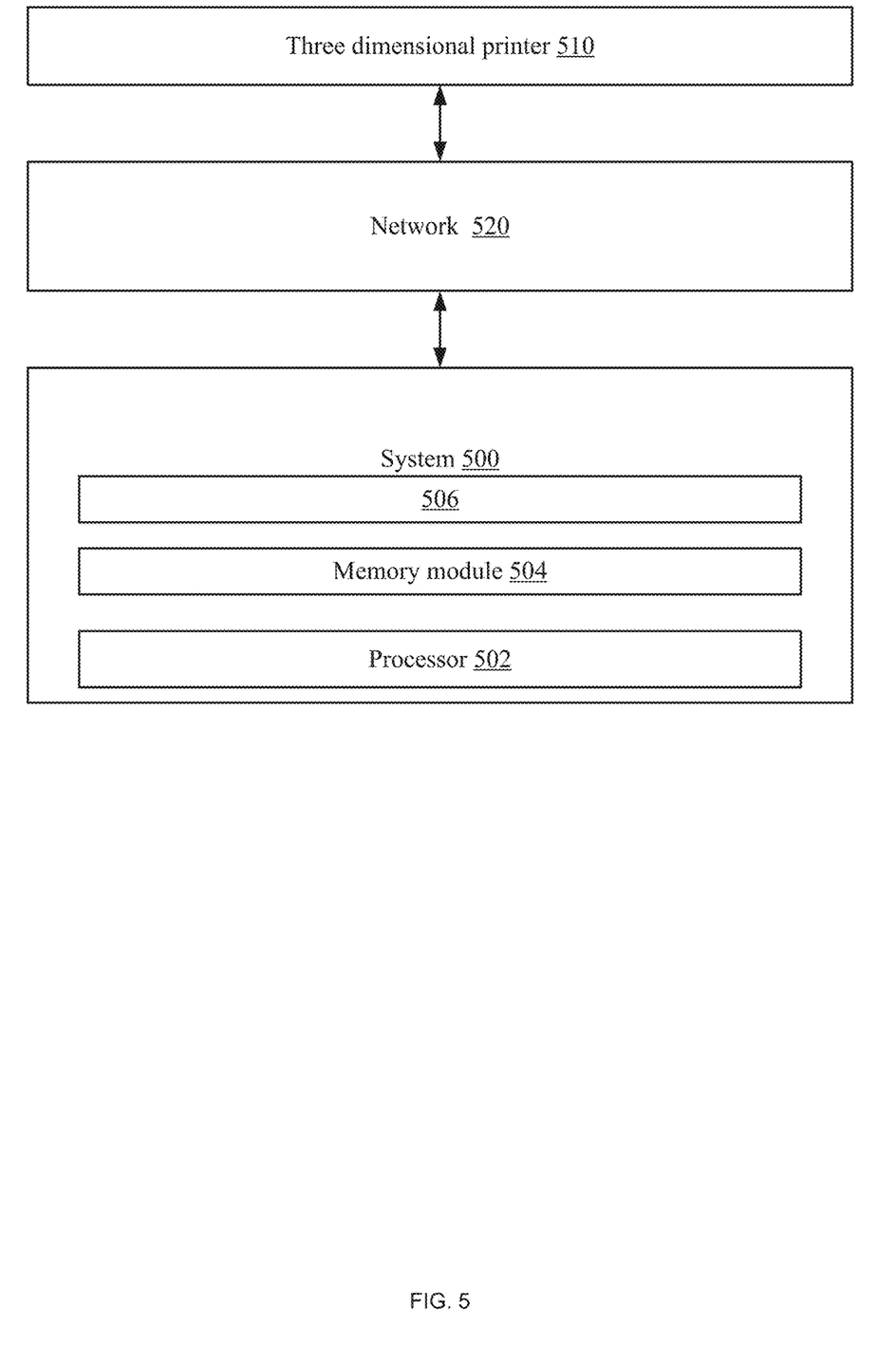
FIG. 5 illustrates an example of a system and data structures.

FIG. 5 illustrates an example of a system 900.

The system may be configured to execute one or more of any of the methods mentioned above.

FIG. 5 illustrates the system 900 as being coupled to a three dimensional printer 910 and a network 920.

The system 900 may be a computer such as a laptop, a desktop, a server, a mobile phone, a personal data assistant, a media player, or any system that may execute programs and communicate with other devices. The system 900 may be directly or indirectly accessed by a user. For example, the system 900 may be a server that can communicate with a user device that differs from system 900. Alternatively, the system may be a user device that includes a man machine interface (keyboard, screen, touch screen, mouse, voice activation interface, and the like). In the latter scenario the user device may be arranged to execute an application that allows the user to benefit from the computerized services of system 900.

Network 920 may be a wired network, wireless network, a combination of wired and wireless networks, a local area network, a wide area network, the Internet and the like.

Any of the methods may be executed by system 900 that includes a processor 902 and a memory module 904. The processor may be a general purpose processor, a digital signal processor or a dedicated hardware arranged to perform the processing illustrated in the patent application.

Reference number 906 is allocated to any data structure, variable, result, calculation result, variable, function, sum, decomposition, sample point, normal, difference, output of any function, any polynomial, or any information entity utilized in any one of methods illustrated above.

There may be provided a non-transitory computer readable medium that may store instructions that once executed by a computer cause the computer to execute the stages of: calculating a first function that represents an object that may be three dimensional; calculating a second function that may be a convolution or an approximated convolution of (a) the first function applied on points of the object, and (b) an other function that may be the first function composed with a function that sends points of the object to opposite points; wherein the second function may be translation invariant; and calculating translation and rotation invariant features of the three dimensional object, based on the second function.

There may be provided a non-transitory computer readable medium that may store instructions that once executed by a computer cause the computer to execute the stages of: sampling an object that may be three dimensional sample points; and calculating translation and rotation invariant features of the object, wherein each translation and rotation invariant features may include (a) a Euclidean norm of a first difference between a first pair of sample points; (b) a Euclidean norm of a second difference between a second pair of sample points, (c) a normal to a point of the first pair, (d) a normal to a point of the second pair, (e) an element that may be responsive to (i) a first unique rotation in that moves a direction vector of the first difference to a north pole of a sphere and moves the normal to the point of the first pair to a zero degrees azimuth of the sphere, and (ii) a second unique rotation in that moves a direction vector of the second difference to the north pole of the sphere and moves the normal to the point of the second pair to the zero degrees azimuth of the sphere.

There may be provided a non-transitory computer readable medium that may store instructions that once executed by a computer cause the computer to execute the stages of: calculating a first function that represents an object that may be three dimensional; calculating a second function that may be a convolution or an approximated convolution of (a) the first function applied on points of the object, and (b) an other function that may be the first function composed with a function that sends points of the object to opposite points; wherein the second function may be translation invariant; and calculating translation and rotation invariant features of the three dimensional object, based on the second function.

The first function includes information about a direction of normals to surfaces of the object.

The first function may be a sum of delta functions located at sample points of the object.

The calculating of the translation and rotation invariant features may include: decomposing the second function to a sum of irreducible representations of three dimensional rotation group; the irreducible representations may be of different types; and calculating multiple tensor products, each tensor product may be calculated between a combination of at least two irreducible representations of a same type of irreducible representations.

The calculating of the multiple tensor products may be followed by projecting a tensor product of the multiple tensor products.

The calculating translation and rotation invariant features may include: decomposing the second function to a sum of vectors contained in different irreducible representations of the three dimensional rotation group; the irreducible representations may be of different types; and calculating multiple tensor products, each tensor product may be calculated between a combination of at least two such vectors in two irreducible representations of a same type of irreducible representations.

The calculating of the multiple tensor products may be followed by projecting a tensor product of two or more such vectors that may be contained in a tensor product of irreducible representations to a trivial representation contained in the tensor product to obtain a translation and rotation invariant feature of the second function and therefore of the object.

The first function includes information about at least one of a color of some or all points on the object The calculating of the second function may include: calculating a first moment generating function of the first function; calculating a second moment generating function of the other function; and multiplying the first moment generating function by the second moment generating function.

The calculating of the second function may include integrating the other function over a sphere to provide an intermediate result.

The calculating of the second function may include calculating a convolution between (a) the first function, and (b) the intermediate result.

The non-transitory computer readable medium may include removing translation and rotation invariant features of the object having a frequency that exceeds a frequency threshold.

The non-transitory computer readable medium may include decomposing the second function to a weighted sum of functions $$\|x\|^d \cdot Y_{l,m}\left(\frac{x}{\|x\|}\right),$$

wherein x may be three dimension coordinates, $\|x\|$ may be a Euclidean norm of x, $Y_{l,m}$ may be Laplace's spherical harmonics, wherein the values of l, m and a variable d exhibit a predefined relationship.

The non-transitory computer readable medium assuming the first function has normal information, may include decomposing the second function to a weighted sum of functions $$\|x\|^d \cdot Y_{l1,m1}\left(\frac{x}{\|x\|}\right) \cdot Y_{l2,m2}(s)$$

wherein x may be three dimension coordinates, $\|x\|$ may be a Euclidean norm of x, $Y_{l,m}$ may be Laplace's spherical harmonics, s may be a point in the sphere, and the values of l1, l2, m1, m2 and a variable d exhibit a predefined relationship.

The non-transitory computer readable medium that may store instructions for determining a radial symmetry of the object based on the translation and rotation invariant features of the object.

The determining of the radial symmetry of the object may include: (a) assuming the radial symmetry, and (b) solving a family of polynomial equations that that may be satisfied, under the assumed radial symmetry, by the translation and rotation invariant features of the three dimensional object.

The non-transitory computer readable medium that may store instructions for determining approximate radial symmetry of the object based on the translation and rotation invariant features of the object.

The non-transitory computer readable medium that may store instructions for comparing the translation rotation invariant features of the object to rotation invariant features of multiple other reference objects.

The non-transitory computer readable medium that may store instructions for training a classifier to classify objects based on translation and rotation invariant representations of one or more objects.

The first function may be expressed by a weighted sum of functions of type $a_{d,l,m,p}\|x\|^d \cdot Y_{l,m}(x)$ where the coefficient $a_{d,l,m,p}$ is the integral of $\|x\|^d \cdot Y_{l,m}(x)$ on a polygon p of the mesh.

The first function may be expressed by a weighted sum of functions of type $a_{d,l1,m1,l2,m2}\|x\|^d \cdot Y_{l1,m1}(x) \cdot Y_{l2,m2}(s)$.

There may be provided a non-transitory computer readable medium that may store instructions that once executed by a computer cause the computer to execute the stages of: sampling an object that may be three dimensional sample points; and calculating translation and rotation invariant features of the object, wherein each translation and rotation invariant feature may include (a) a Euclidean norm of a first difference between a first pair of sample points; (b) a Euclidean norm of a second difference between a second pair of sample points, (c) a normal to a point of the first pair, (d) a normal to a point of the second pair, (e) an element that may be responsive to (i) a first unique rotation in that moves a direction vector of the first difference to a north pole of a sphere and moves the normal to the point of the first pair to a zero degrees azimuth of the sphere, and (ii) a second unique rotation in that moves a direction vector of the second difference to the north pole of the sphere and moves the normal to the point of the second pair to the zero degrees azimuth of the sphere. It should be noted that these translation and rotation invariant features may be used in searches, similarity comparison, rotational symmetry calculations and in other uses.

The element may be a product of an inverse of the first unique rotation multiplied by the second unique function.

There may be provided a non-transitory computer readable medium for finding similarities between a first object that may be three dimensional and a second object that may be three dimensional object, the non-transitory computer readable medium stores instructions that once executed by a computer cause the computer to execute the stages of: obtaining a translation and rotation invariant features of the first object; obtaining a translation and rotation invariant features of the second object; and calculating a distance between the translation and rotation invariant features of the first object and the translation and rotation invariant features of the second object; and wherein the translation and rotation invariant features of the first object was calculated by:

calculating a first function that represents the first object; calculating a second function that may be a convolution or an approximated convolution of (a) the first function applied on points of the first object, and (b) an other function that may be the first function composed with a function that sends points of the object to opposite points; wherein the second function may be translation invariant; and calculating translation and rotation invariant features of the object, based on the second function.

There may be provided a non-transitory computer readable medium for searching for a matching reference object that matches a query object, the non-transitory computer readable medium stores instructions that once executed by a computer cause the computer to execute the stages of: obtaining a translation and rotation invariant features of the query object; wherein the query object may be three dimensional; calculating distance between the translation and rotation invariant features of the query object and translation and rotation invariant features of reference objects that may be three dimensional; and determining whether one of the reference objects may be the matching object based on the distances; wherein the translation and rotation invariant features of the query object were calculated by: calculating a first function that represents the query object; calculating a second function that may be a convolution or an approximated convolution of (a) the first function applied on points of the query object, and (b) an other function that may be the first function composed with a function that sends points of the object to opposite points; wherein the second function may be translation invariant; and calculating the translation and rotation invariant features of the query object, based on the second function. The translation and rotation invariant features were calculated in the same manner.

There may be provided a non-transitory computer readable medium for determining a radial symmetry of an object that may be three dimensional, the non-transitory computer readable medium stores instructions that once executed by a computer cause the computer to execute the stages of: obtaining translation and rotation invariant features of the object; and determining a radial symmetry of the object based on the translation and rotation invariant features of the object; wherein the translation and rotation invariant features of the query object were calculated by: calculating a first function that represents the object; calculating a second function that may be a convolution or an approximated convolution of (a) the first function applied on points of the object, and (b) an other function that may be the first function composed with a function that sends points of the object to opposite points; wherein the second function may be translation invariant; and calculating the translation and rotation invariant features of the query object, based on the second function.

The determining of the radial symmetry of the object may include: (a) assuming the radial symmetry, and (b) solving a family of polynomial equations that that may be satisfied, under the assumed radial symmetry, by the translation and rotation invariant features of the object.

There may be provided a method that may include: calculating a first function that represents an object that may be three dimensional; calculating a second function that may be a convolution or an approximated convolution of (a) the first function applied on points of the object, and (b) an other function that may be the first function composed with a function that sends points of the object to opposite points; wherein the second function may be translation invariant; and calculating translation and rotation invariant features of the three dimensional object, based on the second function.

There may be provided a method that may include sampling an object that may be three dimensional at sample points; and calculating translation and rotation invariant features of the object, wherein each translation and rotation invariant features may include (a) a Euclidean norm of a first difference between a first pair of sample points; (b) a Euclidean norm of a second difference between a second pair of sample points, (c) a normal to a point of the first pair, (d) a normal to a point of the second pair, (e) an element that may be responsive to (i) a first unique rotation in that moves a direction vector of the first difference to a north pole of a sphere and moves the normal to the point of the first pair to a zero degrees azimuth of the sphere, and (ii) a second unique rotation in that moves a direction vector of the second difference to the north pole of the sphere and moves the normal to the point of the second pair to the zero degrees azimuth of the sphere.

There may be provided a method for finding similarities between a first object that may be three dimensional and a second object that may be three dimensional object, the method may include: obtaining a translation and rotation invariant features of the first object; obtaining a translation and rotation invariant features of the second object; and calculating a distance between the translation and rotation invariant features of the first object and the translation and rotation invariant features of the second object; and wherein the translation and rotation invariant features of the first object was calculated by: calculating a first function that represents the first object; calculating a second function that may be a convolution or an approximated convolution of (a) the first function applied on points of the first object, and (b) an other function that may be the first function composed with a function that sends points of the object to opposite points; wherein the second function may be translation invariant; and calculating translation and rotation invariant features of the object, based on the second function.

There may be provided a method for searching for a matching reference object that matches a query object, the method may include: obtaining a translation and rotation invariant features of the query object; wherein the query object may be three dimensional; calculating distance between the translation and rotation invariant features of the query object and translation and rotation invariant features of reference objects that may be three dimensional; and determining whether one of the reference objects may be the matching object based on the distances; wherein the translation and rotation invariant features of the query object were calculated by: calculating a first function that represents the query object; calculating a second function that may be a convolution or an approximated convolution of (a) the first function applied on points of the query object, and (b) an other function that may be the first function composed with a function that sends points of the object to opposite points; wherein the second function may be translation invariant; and calculating the translation and rotation invariant features of the query object, based on the second function.

There may be provided a method for determining a radial symmetry of an object that may be three dimensional, the method may include: obtaining translation and rotation invariant features of the object; and determining a radial symmetry of the object based on the translation and rotation invariant features of the object; wherein the translation and rotation invariant features of the query object were calculated by: calculating a first function that represents the object; calculating a second function that may be a convolution or an approximated convolution of (a) the first function applied on points of the object, and (b) an other function that may be the first function composed with a function that sends points of the object to opposite points; wherein the second function may be translation invariant; and calculating the translation and rotation invariant features of the query object, based on the second function.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium that stores instructions that once executed by a computer cause the computer to execute the stages of:
   calculating a first function that represents an object that is three dimensional;
   calculating a second function that is a convolution or an approximated convolution of (a) the first function applied on points of the object, and (b) an other function that is the first function composed with a function that sends points of the object to opposite points; wherein the second function is translation invariant;
   wherein the calculating of the translation and rotation invariant features comprises: decomposing the second function to a sum of irreducible representations of three dimensional rotation group; the irreducible representations are of different types; and calculating multiple tensor products, each tensor product is calculated between a combination of at least two irreducible representations of a same type of irreducible representations; and
   calculating translation and rotation invariant features of the three dimensional object, based on the second function.

2. The non-transitory computer readable medium according to claim 1 wherein the first function includes information about a direction of normals to surfaces of the object.

3. The non-transitory computer readable medium according to claim 1 wherein the first function is a sum of delta functions located at sample points of the object.

4. The non-transitory computer readable medium according to claim 1 wherein the calculating of the multiple tensor products is followed by projecting a tensor product of the multiple tensor products.

5. The non-transitory computer readable medium according to claim 1 wherein the calculating translation and rotation invariant features comprises:
   decomposing the second function to a sum of vectors contained in different irreducible representations of the three dimensional rotation group; the irreducible representations are of different types; and
   calculating multiple tensor products, each tensor product is calculated between a combination of at least two such vectors in two irreducible representations of a same type of irreducible representations.

6. The non-transitory computer readable medium according to claim 5 wherein the calculating of the multiple tensor products is followed by projecting a tensor product of two or more such vectors that are contained in a tensor product of irreducible representations to a trivial representation contained in the tensor product to obtain a translation and rotation invariant feature of the second function and therefore of the object.

7. The non-transitory computer readable medium according to claim 1 wherein the first function includes information about at least one of a color of some or all points on the object.

8. The non-transitory computer readable medium according to claim 1 wherein the calculating of the second function comprises integrating the other function over a sphere to provide an intermediate result.

9. The non-transitory computer readable medium according to claim 8 wherein the calculating of the second function comprises calculating a convolution between (a) the first function, and (b) the intermediate result.

10. The non-transitory computer readable medium according to claim 1 comprising removing translation and rotation invariant features of the object having a frequency that exceeds a frequency threshold.

11. The non-transitory computer readable medium according to claim 1 assuming the first function has normal information, comprising decomposing the second function to a weighted sum of functions $\|x\|^d \cdot Y_{l1,m1}(x/\|x\|) \cdot Y_{l2,m2}(s)$ wherein x are three dimension coordinates, $\|x\|$ is a Euclidean norm of x, $Y_{l,m}$ are Laplace's spherical harmonics, s is a point in the sphere, and the values of l1, l2, m1, m2 and a variable d exhibit a predefined relationship.

12. The non-transitory computer readable medium according to claim 1 that stores instructions for determining a radial symmetry of the object based on the translation and rotation invariant features of the object.

13. The non-transitory computer readable medium according to claim 12 wherein the determining of the radial symmetry of the object comprises: (a) assuming the radial symmetry, and (b) solving a family of polynomial equations that that are satisfied, under the assumed radial symmetry, by the translation and rotation invariant features of the three dimensional object.

14. The non-transitory computer readable medium according to claim 1 that stores instructions for determining approximate radial symmetry of the object based on the translation and rotation invariant features of the object.

15. The non-transitory computer readable medium according to claim 1 that stores instructions for comparing the translation rotation invariant features of the object to rotation invariant features of multiple other reference objects.

16. The non-transitory computer readable medium according to claim 1 that stores instructions for training a classifier to classify objects based on translation and rotation invariant representations of one or more objects.

17. The non-transitory computer readable medium according to claim 1 wherein the first function is expressed by a weighted sum of functions of type $a_{d,l,m,p}\|x\|^d \cdot Y_{l,m}(x)$, wherein the coefficient $a_{d,l,m,p}$ is the integral of $\|x\|^d \cdot Y_{l,m}(x)$ on a polygon p of the mesh, x are three dimension coordinates, $\|x\|$ is a Euclidean norm of x, and $Y_{l,m}$ are Laplace's spherical harmonics.

18. The non-transitory computer readable medium according to claim 1 wherein the first function is expressed by a weighted sum of functions of type $a_{d,l1,m1,l2,m2}\|x\|^d \cdot Y_{l1,m1}(x) \cdot Y_{l2,m2}(s)$, wherein x are three dimension coordinates, x is a Euclidean norm of x, $Y_{l,m}$ are Laplace's spherical harmonics, s is a point in the sphere, and values of l1, l2, m1, m2 and variable d exhibit a predefined relationship.

19. A non-transitory computer readable medium that stores instructions that once executed by a computer cause the computer to execute the stages of:
calculating a first function that represents an object that is three dimensional;
calculating a second function that is a convolution or an approximated convolution of (a) the first function applied on points of the object, and (b) an other function that is the first function composed with a function that sends points of the object to opposite points; wherein the second function is translation invariant; and
calculating translation and rotation invariant features of the three dimensional object, based on the second function; wherein the calculating of the second function comprises: calculating a first moment generating function of the first function; calculating a second moment generating function of the other function; and multiplying the first moment generating function by the second moment generating function.

20. A non-transitory computer readable medium that stores instructions that once executed by a computer cause the computer to execute the stages of:
calculating a first function that represents an object that is three dimensional;
calculating a second function that is a convolution or an approximated convolution of (a) the first function applied on points of the object, and (b) an other function that is the first function composed with a function that sends points of the object to opposite points; wherein the second function is translation invariant;
calculating translation and rotation invariant features of the three dimensional object, based on the second function; and decomposing the second function to a weighted sum of functions $\|x\|^d (Y_{l,m} (x/\|x\|))$, wherein x are three dimension coordinates, $\|x\|$ is a Euclidean norm of x, $Y_{l,m}$ are Laplace's spherical harmonics, wherein the values of l, m and a variable d exhibit a predefined relationship.

* * * * *